(12) United States Patent
Brandl et al.

(10) Patent No.: US 8,639,104 B2
(45) Date of Patent: Jan. 28, 2014

(54) OPTICAL LIGHTING DEVICE AND OPTICAL RECORDING DEVICE

(75) Inventors: Michael Brandl, Mintraching (DE); Alexander Wilm, Regensburg (DE)

(73) Assignee: OSRAM Opto Semiconductors GmbH (DE)

( * ) Notice: Subject to any disclaimer, the term of this patent is extended or adjusted under 35 U.S.C. 154(b) by 50 days.

(21) Appl. No.: 13/319,163

(22) PCT Filed: May 14, 2010

(86) PCT No.: PCT/DE2010/000539
§ 371 (c)(1),
(2), (4) Date: Nov. 30, 2011

(87) PCT Pub. No.: WO2010/139294
PCT Pub. Date: Dec. 9, 2010

(65) Prior Publication Data
US 2012/0114321 A1 May 10, 2012

(30) Foreign Application Priority Data

Jun. 5, 2009 (DE) .................. 10 2009 024 069

(51) Int. Cl.
*G03B 13/00* (2006.01)
*G03B 15/03* (2006.01)
*F21V 9/00* (2006.01)

(52) U.S. Cl.
USPC ............. 396/106; 396/155; 362/11; 362/231

(58) Field of Classification Search
USPC .................. 396/106, 155; 362/11, 231
See application file for complete search history.

(56) References Cited

U.S. PATENT DOCUMENTS

| 5,317,362 A | 5/1994 | Takahashi |
| 5,895,128 A | 4/1999 | Kishimoto et al. |
| 2005/0063195 A1 | 3/2005 | Kawakami |
| 2007/0040101 A1 | 2/2007 | Haas et al. |
| 2007/0081811 A1 | 4/2007 | Helbing et al. |
| 2007/0153495 A1 | 7/2007 | Wang et al. |
| 2007/0196095 A1 | 8/2007 | Perala et al. |
| 2009/0046453 A1 | 2/2009 | Kramer |
| 2009/0161338 A1 | 6/2009 | Teranishi et al. |

FOREIGN PATENT DOCUMENTS

| CN | 1860616 | 11/2006 |
| CN | 1938864 | 3/2007 |
| CN | 101446741 A | 6/2009 |
| DE | 103 45 410 | 5/2005 |
| DE | 10 2004 037 020 A1 | 8/2005 |

(Continued)

OTHER PUBLICATIONS

English translation of First Official Action in corresponding Chinese Application No. 201080024837X dated Sep. 24, 2013.

*Primary Examiner* — Rochelle-Ann J Blackman
(74) *Attorney, Agent, or Firm* — DLA Piper LLP (US)

(57) ABSTRACT

An optical lighting device includes a radiation detector, a first light source and a second light source. The radiation detector includes a semiconductor chip and an optical filter, and has a spectral sensitivity distribution. The first light source generates white radiation. The second light source generates monochrome radiation in the visible spectral range, wherein radiation emitted by the first light source and radiation emitted by the second light source are superimposed to yield mixed radiation which includes a wavelength spectrum. The wavelength spectrum of the mixed radiation is adapted to the spectral sensitivity distribution of the radiation detector.

16 Claims, 2 Drawing Sheets

(56) References Cited

FOREIGN PATENT DOCUMENTS

| | | |
|---|---|---|
| DE | 10 2005 022 832 A1 | 11/2006 |
| DE | 10 2007 042 573 A1 | 3/2009 |
| EP | 1 950 978 A1 | 7/2008 |
| JP | 2006-138900 A | 6/2006 |
| WO | 2006/105649 A1 | 10/2006 |
| WO | 2008/041153 A1 | 4/2008 |
| WO | 2008/065170 | 6/2008 |

OPTICAL LIGHTING DEVICE AND OPTICAL RECORDING DEVICE

RELATED APPLICATIONS

This application is a §371 of International Application No. PCT/DE2010/000539, with an international filing date of May 14, 2010 (WO 2010/139294, published Dec. 9, 2010), which claims priority from German Patent Application 10 2009 024 069.1, filed Jun. 5, 2009, hereby included by reference.

TECHNICAL FIELD

This disclosure relates to an optical lighting device with a radiation detector, a first light source and a second light source. The optical lighting device is particularly suitable for use in or with an optical recording device.

BACKGROUND

Optical lighting devices are known in DE 10 2007 042 573 A1, which comprises a detector, a light source and a control means. The control means is suitable for adjusting a spectral characteristic of the radiation emitted by the light source as a function of the determined spectral characteristic of the ambient light.

With such lighting devices, the spectral characteristic of the light emitted by the light source is adapted to a determined spectral characteristic of the ambient light. In particular, the light from the lighting device is adjusted to be as similar as possible to the ambient light. However, this reduces efficiency with regard to illumination of the radiation detector by means of the light source.

It could therefore be helpful to provide an improved optical lighting device which is distinguished in particular by efficient illumination of the radiation detector. It could further be helpful to provide an optical recording device with such an optical lighting device.

SUMMARY

We provide an optical lighting device including a radiation detector including a semiconductor chip and an optical filter, and having a spectral sensitivity distribution, a first light source that generates white radiation, and a second light source that generates monochrome radiation in a visible spectral range, wherein radiation emitted by the first light source and radiation emitted by the second light source are superimposed to yield mixed radiation which has a wavelength spectrum, and wherein the wavelength spectrum of the mixed radiation is adapted to a spectral sensitivity distribution of the radiation detector.

We also provide an optical light device including a radiation detector including a semiconductor chip and an optical filter, and having a spectral sensitivity distribution, a first light source that generates white radiation, and a second light source that generates monochrome radiation in a visible spectral range, wherein radiation emitted by the first light source and radiation emitted by the second light source are superimposed to yield mixed radiation which has a wavelength spectrum, wherein the wavelength spectrum of the mixed radiation is adapted to a spectral sensitivity distribution of the radiation detector so that the wavelength spectrum deviates by at most about 20% from the spectral sensitivity distribution, and wherein the spectral sensitivity distribution of the radiation detector is adapted to a spectral sensitivity distribution of the human eye.

DETAILED DESCRIPTION

Figure 1:
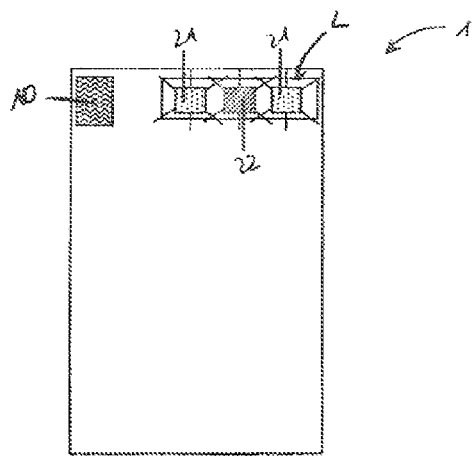
FIG. 1 is a schematic view of an example of an optical recording device with a lighting device.

We provide an optical lighting device which comprises a radiation detector, a first light source and a second light source. The radiation detector comprises a semiconductor chip and an optical filter, and has a spectral sensitivity distribution. The first light source is suitable for generating white radiation. The second light source is suitable for generating monochrome radiation in the visible spectral range, wherein the radiation emitted by the first light source and the radiation emitted by the second light source are superimposed to yield mixed radiation, which has a wavelength spectrum. The wavelength spectrum of the mixed radiation is adapted to the spectral sensitivity distribution of the radiation detector.

In this case, the profile of the wavelength spectrum of the mixed radiation is in particular adapted to the profile of the spectral sensitivity distribution of the radiation detector.

The first light source is preferably suitable for generating white radiation, wherein the radiation emitted by the first light source exhibits a continuous or quasi-continuous spectrum in the wavelength range of between 450 nm and 700 nm inclusive. The first light source thus preferably emits radiation having a continuous spectrum in the visible wavelength range.

The radiation detector is, for example, a detector which comprises different subzones, which are suitable for detecting red, green or blue radiation, i.e., so-called red, green and blue pixels. Each pixel is in this case preferably provided with its own filter corresponding to the respective color from among red, green or blue.

The second light source is suitable for generating monochrome radiation in the visible spectral range. It is not in this case absolutely necessary for the second light source to emit radiation of only one wavelength range. The second light source may, for example, be a chip which emits radiation in the blue spectral range and comprises a conversion layer which converts the radiation emitted by the chip into red radiation, such that the radiation emitted by the second light source exhibits a broader spectrum than is achieved with a blue chip without conversion layer.

For comparison of the wavelength spectrum of the mixed radiation with the spectral sensitivity distribution of the radiation detector, the wavelength spectrum and the spectral sensitivity distribution are preferably each normalized. To this end, the maximum value of the respective spectrum is in each case normalized to 1. Alternatively, the wavelength spectrum of the mixed radiation may be adjusted in accordance with the spectral sensitivity distribution of the radiation detector.

Normalization or adjustment advantageously allows the profiles of the wavelength spectrum and the spectral sensitivity distribution to be compared.

In particular, consideration of the respective spectra is preferably restricted to the visible spectral range.

If nothing else is indicated, this description relates in each case to the normalized or adjusted spectral sensitivity distribution or wavelength spectrum.

For good adaptation it may be regarded as sufficient for the wavelength spectrum largely to correspond to the spectral sensitivity distribution. Complete correspondence of the wavelength spectrum and the sensitivity distribution is not absolutely essential. Instead, the intention is to achieve the best possible adaptation to the sensitivity distribution.

In particular, the wavelength spectrum of the mixed radiation is adapted to the optical filter of the detector. If the detector is, for example, a chip comprising red, green and blue pixels, each pixel being provided with its own filter corresponding to the respective color from among red, green or blue, the wavelength spectrum of the mixed radiation is preferably adapted to the transmission characteristic of the individual filters. At the same time, a continuous white spectrum of the mixed radiation may advantageously be provided.

The lighting device comprises at least two light sources, which emit radiation at different color locations also referred to as chromaticity coordinate. When the lighting device is in operation the different radiations are superimposed to yield a mixed radiation, which has a wave-length spectrum. The profile of the wavelength spectrum of the mixed radiation in particular may be adjusted as a function of the intensity with which the light sources emit their radiation.

The intensity of the radiation emitted by each of the light sources may here be adjusted, for example, by the intensity of the current supplied to this light source. The greater the current intensity, the greater the intensity of the radiation emitted.

Alternatively, the intensity of the radiation emitted by each of the light sources may be adjusted using pulse width modulation.

The wavelength spectrum of the mixed radiation is preferably adapted to the spectral sensitivity distribution of the radiation detector using a control means/controller. In particular, the radiation detector has a spectral sensitivity distribution when in operation. The control means processes the values from the detector, in particular the spectral sensitivity distribution, and when in operation adjusts a wavelength spectrum of the mixed radiation emitted by the light sources such that the mixed radiation is adapted to the spectral sensitivity distribution of the radiation detector. The control means is, for example, a microcontroller.

One-off adjustment is advantageously sufficient in this case. Once the wavelength spectrum of the mixed radiation emitted by the light sources has been adapted by the control means to the spectral sensitivity distribution of the radiation detector, further adaptation such as is necessary, for example, with conventional lighting devices, which adapt the radiation of each light source to the ambient light, is not necessary.

A lighting device in which the wavelength spectrum of the mixed radiation is adapted to the spectral sensitivity distribution of the radiation detector advantageously improves the efficiency of the lighting device. Efficient illumination of the radiation detector by the light sources may in particular be achieved in this way.

The wavelength spectrum of the mixed radiation in the visible spectral range may have a quasi-continuous or continuous spectrum.

A continuous spectrum follows in part the spectrum of a black body. A quasi-continuous spectrum is, in particular, similar to the spectrum of a black body, therefore comprising merely slight deviations from the spectrum of a black body.

A continuous or quasi-continuous spectrum of the mixed radiation advantageously permits efficient illumination of the radiation detector. In particular, the wavelength spectrum of the mixed radiation may be better adapted to the spectral sensitivity distribution of the radiation detector.

The wavelength spectrum of the mixed radiation preferably does not comprise any gaps in the visible spectral range. Gaps are understood, for example, to be major fluctuations in intensity, for example, drops in intensity, in one or more wavelength ranges of the wavelength spectrum.

The wavelength spectrum of the mixed radiation is preferably adapted to the color reproduction of the detector. The wavelength spectrum of the mixed radiation is particularly preferably adapted to the color reproduction and to the profile of the spectral sensitivity distribution of the radiation detector. A continuous spectrum of the mixed radiation is of particular advantage for adapting the color reproduction. Adaptation of the profile of the wavelength spectrum may, for example, proceed by intensity adjustment of the second light source, which emits monochrome radiation.

The first light source may be a light-emitting diode chip. The light-emitting diode chip is, in particular, suitable for generating white radiation. For example, the first light source comprises a light-emitting diode chip which comprises a semiconductor layer sequence and a conversion layer arranged thereon, the semiconductor layer sequence being suitable for emitting radiation in the blue spectral range and the conversion layer being suitable for converting radiation in the blue spectral range such that white radiation arises as a result of superimposition. The conversion layer, for example, converts the blue radiation emitted by the semiconductor layer sequence into yellow radiation. The converted radiation is not limited here to yellow radiation. A conversion layer is likewise conceivable which is suitable for converting radiation emitted by the semiconductor layer sequence into green radiation or red radiation.

Alternatively, the first light source may be a xenon lamp.

The second light source may comprise a light-emitting diode chip, which emits monochrome radiation in the red spectral range.

Also conceivable as the second light source are light-emitting diode chips which emit monochrome radiation, for example, in the green or blue spectral ranges. Selection of the color gamut of the radiation emitted by the second light source depends, in particular, on the filter characteristic of the radiation detector.

The mixed radiation arises, for example, from superimposition of white and red radiation. Depending on the intensity with which the first light source and/or the second light source emit their radiation, the wavelength spectrum may thus be adjusted, in particular, adapted to the spectral sensitivity distribution of the radiation detector. If the spectral sensitivity distribution of the radiation detector comprises a high proportion of red, for example, it is possible to increase the intensity of the red radiation and thus the red proportion of the mixed radiation by a high current intensity of the second light source, which is suitable for emitting radiation in the red spectral range.

In this case, in particular, a specific proportion of red radiation may be admixed with the mixed radiation. The purposeful addition of red radiation through the supply of current to the second light source for a predetermined period of time at a predetermined current intensity may, in particular, compensate a lack of red radiation in the mixed radiation. Overall, the wavelength spectrum of the mixed radiation may advantageously be adapted to the spectral sensitivity distribution of the radiation detector.

The wavelength spectrum may deviate on average by at most 40% from the spectral sensitivity distribution. The wavelength spectrum preferably deviates on average by at most 20%. Ideally, the wavelength spectrum of the mixed radiation is adjusted such that, in the context of fault tolerances of radiation detector, first light source and second light source, it is equal to the spectral sensitivity distribution of the radiation detector. It is preferably the normalized spectra of the wavelength spectrum and the sensitivity distribution which are here considered.

The area under the curve of the wavelength spectrum of the mixed radiation may be adapted to the area under the curve of the sensitivity distribution of the detector. The more the area under the curve of the wavelength spectrum of the mixed radiation overlaps with the curve of the sensitivity distribution of the detector, the greater is advantageously efficiency in terms of illumination of the radiation detector.

The lighting device may further comprise a third light source for generating monochrome radiation in the visible spectral range, the monochrome radiation of the third light source being different from the monochrome radiation of the second light source.

For example, the second light source is suitable for generating red radiation and the third light source is suitable for generating green radiation.

The lighting device may further comprise a fourth light source for generating monochrome radiation in the visible spectral range, the monochrome radiation of the fourth light source being different from the monochrome radiation of the third light source and from the monochrome radiation of the second light source.

For example, the first light source is a first light-emitting diode chip, which emits white radiation, the second light source is a second light-emitting diode chip, which emits radiation in the red spectral range, the third light source is a third light-emitting diode chip, which emits radiation in the green spectral range, and the fourth light source is a fourth light-emitting diode chip, which emits radiation in the blue spectral range.

The optical lighting device in this case thus comprises a white light-emitting diode chip and RGB LEDs. The radiation emitted by the individual light-emitting diode chips is altogether superimposed to yield mixed radiation having a wavelength spectrum.

The wavelength spectrum may be changed, in particular adjusted, into different spectral ranges by the RGB LEDs, depending on the current supplied to the individual RGB LEDs. If the spectral sensitivity distribution of the radiation detector, for example, comprises a high intensity in the red spectral range but a low intensity in the green spectral range, the wavelength spectrum of the mixed radiation may thus be adapted to the spectral sensitivity distribution of the radiation detector by supplying a high current intensity to the red light-emitting diode chip and a low current intensity to the green light-emitting diode chip.

The spectral sensitivity distribution of the radiation detector may be adapted to the spectral sensitivity distribution of the human eye.

It may be regarded as sufficient for the purposes of good adaptation for the spectral sensitivity distribution of the radiation detector largely to correspond to the spectral sensitivity distribution of the human eye.

Complete correspondence of the spectral sensitivity distributions is not absolutely essential.

To compare the spectral sensitivity distribution of the radiation detector with the spectral sensitivity distribution of the human eye it is convenient to adapt the two sensitivity distributions in such a way that they are normalized.

The spectral sensitivity distribution of the human eye adapted to bright light, in particular, exhibits a sensitivity maximum at around $\lambda=555$ nm. The sensitivity maximum of the eye adapted to the dark is roughly $\lambda=500$ nm. The radiation detector is thus, in particular, configured to detect radiation in accordance with the sensitivity of the human eye, which has a sensitivity maximum at roughly $\lambda=555$ nm (adapted to bright light, daytime vision) or at roughly $\lambda=500$ nm (adapted to the dark, night vision). Such radiation detectors are known, for example, in DE 10 2004 037 020 A1 and DE 10 345 410 A1, the subject matter of which is hereby explicitly incorporated herein by reference.

An optical recording device with one of the optical lighting devices described herein is also provided. The optical lighting device of the recording device is here configured as disclosed in relation to one of the above-described embodiments. In other words, all features disclosed in relation to the optical lighting device are also disclosed for the lighting device of the recording device and vice versa.

The optical recording device may be one of the following devices: mobile telephone, camera, video camera.

The first light source may be a flash lamp. The first light-emitting diode is accordingly suitable for producing a flash of light of a specific illumination duration. Preferably, an apparatus is provided in the optical recording device which is suitable for supplying current to the first light-emitting diode for these time periods. The apparatus may, for example, comprise a pulse width modulation circuit.

Alternatively, the first light-emitting diode may serve as continuous illumination, for example, as illumination for a video camera. The light sources may, for example, be adjustable by pulse width modulation such that the light sources emit radiation only when recording.

The second light source may serve as illumination for an autofocus facility. The second light source is accordingly additionally used to adjust a lens system such that a sharp image of an object may be recorded.

The second light source may be set up as a record indicator. Record indicators are inter alia also known under the term "privacy light." This is used, in particular, to indicate to a person opposite that he is being recorded.

The second light source may be a preflash which reduces "red eye." The second light source is thus used as a preflash to reduce red eye when taking photographs. The second light source is preferably suitable in this case for emitting radiation in the red spectral range. The second light source may thus be used as a preflash which is particularly gentle on the eye.

Further features, advantages, preferred configurations and convenient aspects of the optical lighting device and of the optical recording device are revealed by the examples explained below with reference to FIGS. 1 to 5.

Identical or equivalently acting components are in each case denoted with identical reference numerals. The components illustrated and the size ratios of the components to one another should not be regarded as to scale.

FIG. 1 shows a schematic view of an optical recording device, which comprises an optical lighting device 1 with a radiation detector 10. The radiation detector 10 comprises, in particular, a semiconductor chip and an optical filter, and has a spectral sensitivity distribution.

The spectral sensitivity distribution of the radiation detector 10 is preferably adapted to the spectral sensitivity distribution of the human eye. The spectral sensitivity distribution of the radiation detector 10 is, in particular, adapted to the human eye adapted to bright light or the human eye adapted to the dark.

The optical recording device preferably has a zone L in which light sources 21, 22 are arranged for illumination purposes. In the example of FIG. 1 there are, in particular, arranged two first light sources 21 for generating white radiation and one second light source 22 for generating monochrome radiation in the visible spectral range. The second light source 22 is preferably arranged between the first light sources 21.

When the optical recording device is in operation, the radiation emitted by the first light sources 21 and the radiation emitted by the second light source 22 are superimposed to yield a mixed radiation, which has a wavelength spectrum.

The wavelength spectrum of the mixed radiation is preferably adapted to the spectral sensitivity distribution of the radiation detector 10. Here, the wavelength spectrum of the mixed radiation and the spectral sensitivity distribution of the radiation detector 10 are preferably normalized for comparison purposes.

The wavelength spectrum preferably deviates on average by at most 40% from the spectral sensitivity distribution. The wavelength spectrum deviates on average particularly preferably by at most 20%.

Because the wavelength spectrum of the mixed radiation is adapted to the spectral sensitivity distribution of the radiation detector 10, the radiation detector 10 may advantageously be efficiently illuminated by the first and second light sources 21, 22. An efficient lighting device 1, and thus an efficient recording device, may advantageously be achieved in this way.

The wavelength spectrum of the mixed radiation in the visible spectral range preferably has a quasi-continuous or continuous spectrum. This advantageously allows improved, in particular efficient, illumination of the radiation detector 10.

The first light sources 21 are preferably a light-emitting diode chip or a xenon lamp. The first light sources 21 are, for example, in each case a light-emitting diode chip comprising a semiconductor layer sequence, which emits radiation in the blue spectral range, and a conversion layer or an encapsulation, which comprises a conversion material and converts radiation in the blue spectral range, for example, into radiation in the yellow spectral range. A white LED chip may thus be achieved.

The second light source 22 is preferably a light-emitting diode chip, which emits monochrome radiation in the red spectral range. In this way, a given proportion of red radiation may, in particular, be admixed with the white radiation of the first light sources 21. The purposeful addition of red radiation may, in particular, compensate a lack of red radiation from the first light sources 21. Overall, the wavelength spectrum of the mixed radiation may advantageously be adapted to the spectral sensitivity distribution of the radiation detector 10.

In particular, the wavelength spectrum of the mixed radiation may be adjusted as a function of the intensity with which the individual light sources 21, 22 emit their radiation. The intensity of the radiation emitted by one of the light sources 21, 22 may here be adjusted, for example, by the intensity of the current supplied to this light source 21, 22. The greater the current intensity, the greater the intensity of the radiation emitted.

The optical recording device of FIG. 1 is, for example, a camera or a mobile telephone. In this case the first light sources 21 are preferably each flash lamps. The second light source 22 is then arranged between the two flash lamps. The second light source 22 is preferably set up as a record indicator, i.e., as a "privacy light." This "privacy light" may be designed such that it is additionally switched on when the recording device is operating in flash mode. Thus, a red content absent from the flash lamp may advantageously be supplied by the "privacy light," such that the wavelength spectrum of the mixed radiation is adapted to the spectral sensitivity distribution of the radiation detector 10.

Alternatively, the optical recording device may be a video camera. In this case the second light source 22 may be set up as a record indicator, or "video light." The "video light" is, in particular, a permanent or flashing light, which indicates operation of the recording device or the video camera.

Figure 2A:
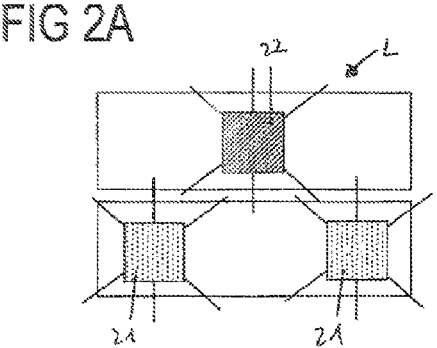
FIGS. 2A and 2B are each schematic views of an example of a portion of an optical lighting device.
Figure 2B:
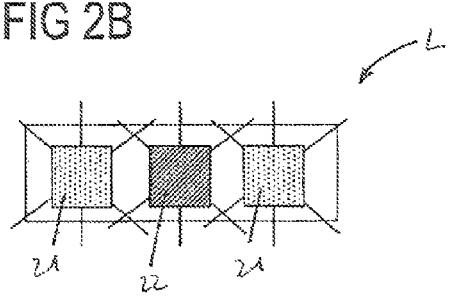

FIGS. 2A and 2B show special arrangements of the first and second light sources 21, 22 relative to one another. In particular, FIGS. 2A and 2B show examples of light arrangements in the zone L, which may be used, for example, in a recording device from FIG. 1.

In FIG. 2A two first light sources 21 are arranged adjacent one another, which are suitable, in particular, for generating white light. The first light sources 21 are preferably LED chips. In addition, a second light source 22 is arranged vertically above the first light sources 21, which second light source emits radiation, in particular, in the red spectral range. The second light source 22 is, for example, arranged between the first light sources 21, but vertically above the first light sources 21. The second light source 22 serves in the example of FIG. 2A, for example, as illumination for an autofocus facility.

FIG. 2B shows a further example of an arrangement of the first and second light sources 21, 22 relative to one another. Unlike the example shown in FIG. 2A, the second light source 22 is arranged directly between the first light sources 21. In this case there is no vertical distance between first light sources 21 and second light source 22.

In the example of FIG. 2B the second light source 22 is, for example, a preflash, which reduces red eye. Alternatively the second light source 22 may be set up as a record indicator.

In the examples of FIGS. 2A and 2B the first light sources 21 are each flash lamps.

Figure 3:
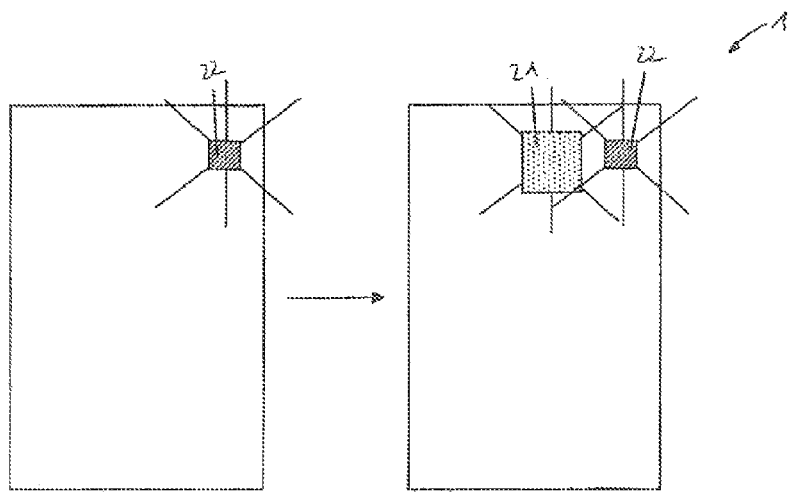
FIGS. 3 to 5 are each schematic views of further examples of an optical recording device with a lighting device.

The example of FIG. 3 shows a further recording device. Unlike the example shown in FIG. 1, the example shown in FIG. 3 comprises just one first light source 21. The radiation detector 10 is not shown in the example of FIG. 3 for the sake of clarity.

In the example of FIG. 3 the second light source 22 serves as illumination for an autofocus facility. As shown in FIG. 3, the first light source 21 may be connected to the second light source 22. The first light source 21 is, in particular, a flash lamp or a light for illuminating video recordings.

The recording device thus comprises a white LED as flash lamp and an extra red LED as illumination for an autofocus facility. The red LED may in this case be designed such that it delivers a red content when operating in flash mode in addition to the white radiation from the first light source 21. The resultant mixed radiation is preferably adapted to the spectral sensitivity distribution of the radiation detector.

Moreover, the example of FIG. 3 corresponds to the example of FIG. 1.

Figure 4:
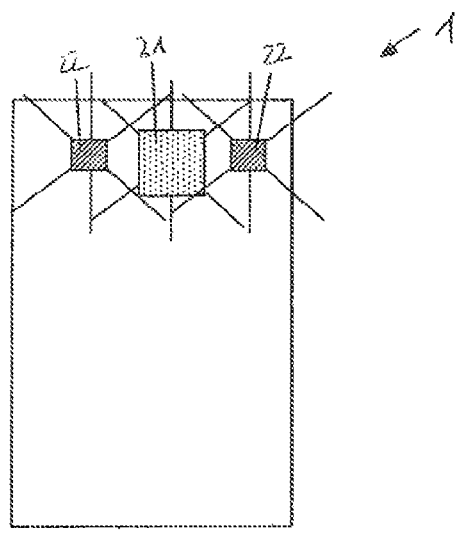

FIG. 4 shows a further example of an optical recording device. Unlike the example shown in FIG. 3, the recording device of FIG. 4 comprises two second light sources 22. The first light source 21 is in this case arranged, in particular, between the two second light sources 22.

The first light source 21 is preferably a flash lamp. The second light sources 22 preferably emit radiation in the red spectral range. The second light sources 22 are, for example, designed as illumination for an autofocus facility, as a record indicator or as preflash.

In the example of FIG. 4 a plurality of colored LEDs, in particular red LEDs, are accordingly added to the flash lamp. The efficiency, in particular the illumination of the radiation detector, may advantageously be improved thereby. In particular, the wavelength spectrum of the mixed radiation consisting of white radiation from the first light source 21 and red radiation from the two second light sources 22 may thus preferably be better adapted to the spectral sensitivity distribution of the radiation detector.

Figure 5:
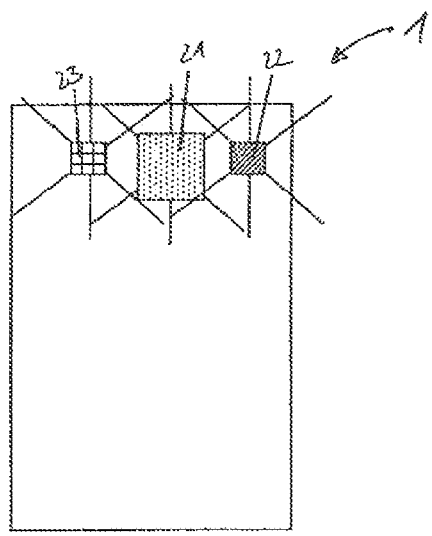

The example of FIG. 5 differs from the example of FIG. 4 in that the recording device comprises a third light source 23 for generating monochrome radiation in the visible spectral range, the monochrome radiation of the third light source being different from the monochrome radiation of the second light source. In particular, the example of FIG. 5 comprises just one second light source 22.

The second light source 22 preferably emits red radiation and the third light source 23 green radiation. In particular a plurality of LEDs of any desired color may be added to the first light source 21, in particular, the flash lamp. The wavelength spectrum of the mixed radiation of the individual light sources 21, 22, 23 may be adapted to the spectral sensitivity distribution and/or to the color reproduction of the radiation detector by supplying current to the individual light sources 21, 22, 23 in different spectral ranges.

The optical lighting device 1 may further comprise a fourth light source for generating monochrome radiation in the visible spectral range (not shown). In this case the first light source is preferably a first light-emitting diode chip, which emits white radiation, the second light source is a second light-emitting diode chip, which emits radiation in the red spectral range, the third light source is a third light-emitting diode chip, which emits radiation in the green spectral range, and the fourth light source is a fourth light-emitting diode chip, which emits radiation in the blue spectral range.

The optical lighting device 1 in this case thus comprises a white light-emitting diode chip 21 and RGB LEDs. The wavelength spectrum of the mixed radiation may be changed, in particular, adjusted and adapted, in the individual monochrome spectral ranges by the RGB LEDs, depending on the current supplied to the individual RGB LEDs. If the spectral sensitivity distribution of the radiation detector has, for example, high intensities in the red spectral range, but low intensities in the blue spectral range, the wavelength spectrum of the mixed radiation may be adapted to the spectral sensitivity distribution by a high current intensity of the red LED chip and by a low current intensity of the blue LED chip.

This disclosure is not limited to the examples as a result of the description made with reference thereto, but instead the devices encompass any novel feature and any combination of features, including, in particular, any combination of features in the appended claims, even if the feature or combination is not itself explicitly indicated in the claims or examples.

The invention claimed is:

1. An optical lighting device comprising:
    a radiation detector comprising a semiconductor chip and an optical filter, and having a spectral sensitivity distribution;
    a first light source that generates white radiation; and
    a second light source that generates monochrome radiation in a visible spectral range, wherein radiation emitted by the first light source and radiation emitted by the second light source are superimposed to yield mixed radiation which has a wavelength spectrum, wherein 1) the wavelength spectrum of the mixed radiation is adapted to a spectral sensitivity distribution of the radiation detector so that the wavelength spectrum deviates on average by at most 40% from the spectral sensitivity distribution, 2) the spectral sensitivity distribution of the radiation detector is adapted to the spectral sensitivity distribution of the human eye, and 3) the second light source is a record indicator.

2. The optical lighting device according to claim 1, wherein a profile and/or the color reproduction of the wavelength spectrum of the mixed radiation is/are adapted to the profile and/or to the color reproduction of the spectral sensitivity distribution of the radiation detector.

3. The optical lighting device according to claim 1, wherein the wavelength spectrum of the mixed radiation in the visible spectral range has a quasi-continuous or continuous spectrum.

4. The optical lighting device according to claim 1, wherein the first light source is a light-emitting diode chip or is xenon lamp.

5. The optical lighting device according to claim 1, wherein the second light source is light-emitting diode chip which emits monochrome radiation in the red spectral range.

6. The optical lighting device according to claim 1, further comprising a third light source that generates monochrome radiation in the visible spectral range, wherein the monochrome radiation of the third light source is different from the monochrome radiation second light source.

7. The optical lighting device according to claim 6, further comprising a fourth light source for generating monochrome radiation in the visible spectral range, wherein the monochrome radiation of the fourth light source is different from the monochrome radiation of the third light source and from the monochrome radiation of the second light source.

8. The optical lighting device according to claim 7, wherein the source is a first light-emitting diode chip which emits white radiation, the second light source is a second light-emitting diode chip which emits radiation in the red spectral range, the third light source is third light-emitting diode chip which emits radiation in the green spectral range, and the fourth light source is a fourth light-emitting diode chip which emits radiation in the blue spectral range.

9. The optical lighting device according to claim 1, wherein the spectral sensitivity distribution of the radiation detector is adapted to a spectral sensitivity distributed of the human eye.

10. An optical recording device comprising the optical lighting device according to claim 1.

11. The optical recording device according to claim 10, wherein the optical recording device is selected from the group consisting of mobile telephone, camera and video camera.

12. The optical recording device according to claim 10, wherein the first light source is a flash lamp.

13. The optical recording device according to claim 10, wherein the second light source illuminates an autofocus facility.

14. The optical recording device according to claim 10, wherein the second light source is a record indicator comprising a flashing light.

15. The optical recording device according to claim 10, wherein the second light source is a preflash which reduces red eye.

16. An optical light device comprising:
    a radiation detector comprising a semiconductor chip and an optical filter, and having a spectral sensitivity distribution;
    exactly one first light source that generates white radiation; and
    exactly one second light source that generates monochrome red radiation, wherein radiation emitted by the first light source and radiation emitted by the second light source are superimposed to yield mixed radiation which has a wavelength spectrum, wherein the wavelength spectrum of the mixed radiation is adapted to a spectral sensitivity distribution of the radiation detector so that the wavelength spectrum deviates by at most about 20% from the spectral sensitivity distribution, and wherein 1) the spectral sensitivity distribution of the radiation detector is adapted to a spectral sensitivity distribution of the human eye, 2) the first light source is a flash light and the second light source is also a record indicator, and 3) the first and the second light sources are the only light sources of the optical light device.

* * * * *

UNITED STATES PATENT AND TRADEMARK OFFICE
CERTIFICATE OF CORRECTION

PATENT NO. : 8,639,104 B2
APPLICATION NO. : 13/319163
DATED : January 28, 2014
INVENTOR(S) : Brandl et al.

It is certified that error appears in the above-identified patent and that said Letters Patent is hereby corrected as shown below:

In the Claims

In Column 10 at line 16, please insert --a-- before "xenon";

at line 19, please insert --a-- before "light-emitting";

at line 25, please insert --of the-- before "second";

at line 33, please insert --first light-- before "source"; and at line 36, please insert --a-- before "third".

Signed and Sealed this
Third Day of June, 2014

Michelle K. Lee
*Deputy Director of the United States Patent and Trademark Office*